United States Patent [19]

Engländer et al.

[11] Patent Number: 4,915,194
[45] Date of Patent: Apr. 10, 1990

[54] LUBRICATING OIL FEED SYSTEM

[75] Inventors: Heinrich Engländer, Jülich; Frank Fleischmann, Bergheim-Glessen; Hans-Peter Kabelitz, Cologne; Winfried Kaiser, Cologne; Friedrich Schmaus, Cologne; Günter Schütz, Cologne; Ralf Steffens, Cologne; Dietrich Urban, Cologne, all of Fed. Rep. of Germany

[73] Assignee: Leybold Heraeus GmbH, Cologne, Fed. Rep. of Germany

[21] Appl. No.: 265,483

[22] Filed: Nov. 1, 1988

[30] Foreign Application Priority Data

Nov. 12, 1987 [EP] European Pat. Off. ........ 87116704.5
Sep. 20, 1988 [EP] European Pat. Off. ........ 88115390.2

[51] Int. Cl.⁴ .................................... F01M 9/00
[52] U.S. Cl. ............................ 184/6.18; 184/6; 184/27.1
[58] Field of Search ............... 184/6, 6.18, 70, 27.1

[56] References Cited

U.S. PATENT DOCUMENTS 2,721,436 10/1955 Hubbard ........................ 184/6.18

FOREIGN PATENT DOCUMENTS 159163 7/1953 Australia .......................... 184/6.18
759025 10/1952 Fed. Rep. of Germany .
2119857 11/1972 Fed. Rep. of Germany .

Primary Examiner—Carroll B. Dority
Attorney, Agent, or Firm—Felfe & Lynch

[57] ABSTRACT

A lubricating system for supplying oil to the bearings of a shaft having a central oil pumping passage open at one end. An oil delivery tube reaches into the oil pumping passage. To achieve a positive transfer of the oil from the oil delivery tube to the inner wall of the oil pumping passage, means are associated with the upper end of the oil delivery tube for bringing the oil onto the inner wall of the oil pumping passage.

11 Claims, 3 Drawing Sheets

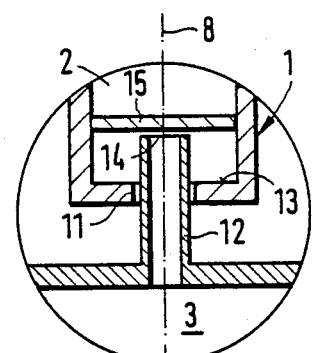
FIG.1
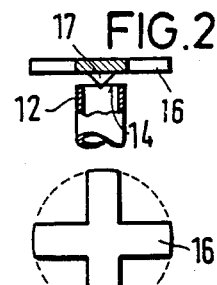
FIG.2
FIG.3
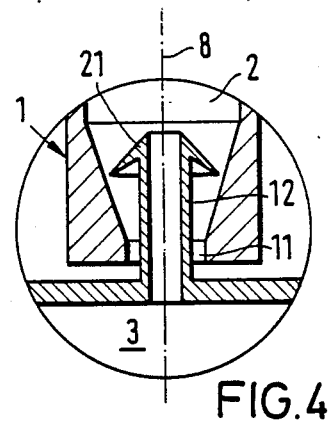
FIG.4
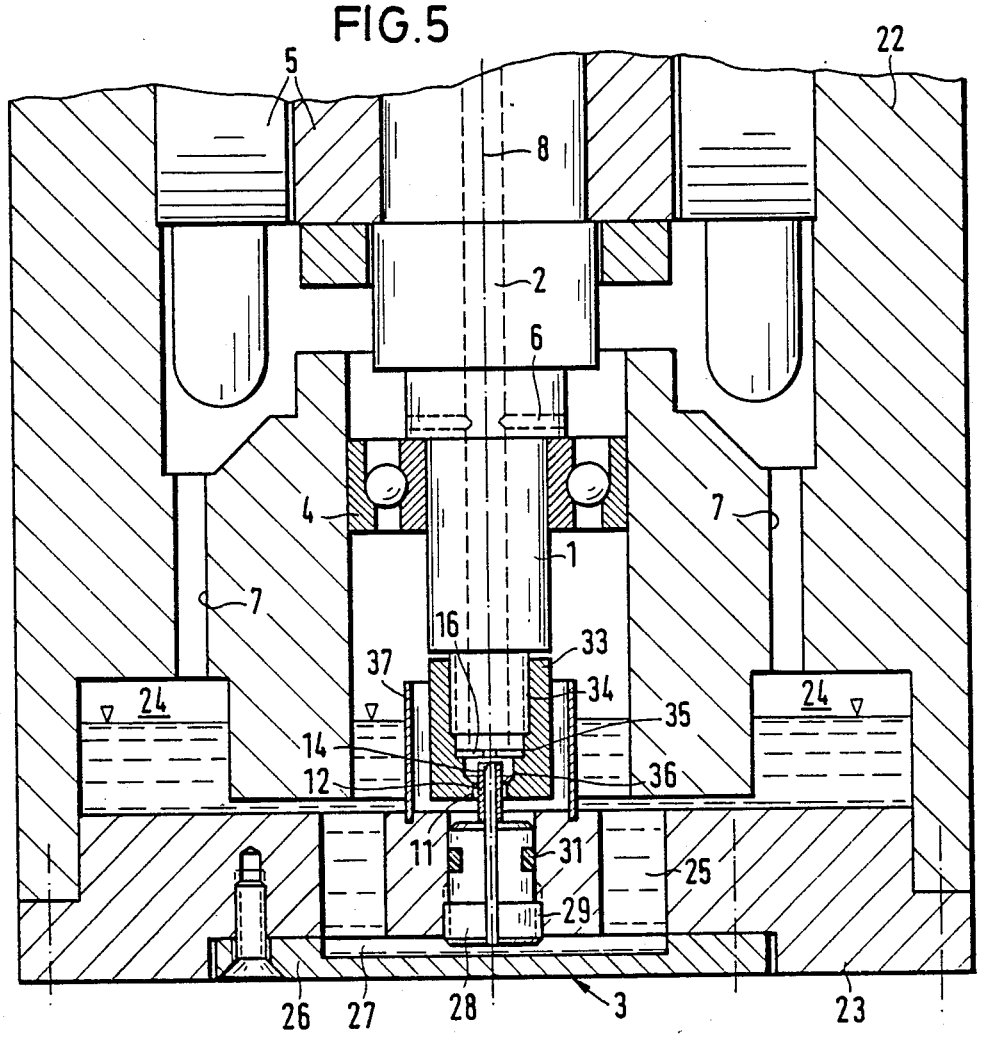
FIG.5

LUBRICATING OIL FEED SYSTEM

BACKGROUND OF THE INVENTION

The invention relates to a system for supplying lubricating oil to the bearing of a shaft with a central oil feeding passage open at one end and an oil delivery tube extending into the oil pumping passage.

The higher the rotational speed of rotating shafts, the more critical it becomes to supply its bearings with lubricant. On the one hand it is necessary to assure that the stream of oil is not interrupted, and on the other hand the oil has to be "metered," i.e., fed to the bearing, at a very low rate.

The German Pat. No. 7 59 025 teaches immersing the bottom end of a vertically disposed shaft in an oil reservoir. At very high rotational speeds this kind of method has proven unsatisfactory. A gap forms between the rotating shaft end and the oil, so that a reliable and continuously uniform oil feed is no longer obtained.

The German published patent application No. 21 19 857 discloses a system of the type described above, with a likewise vertical shaft. The oil delivery tube reaching into the oil pumping passage is in communication with the oil reservoir. This method has also proven unacceptable in practice. Because of manufacturing tolerances a certain space has to be maintained between the outer wall of the oil delivery tube and the inside wall of the oil pumping passage in the shaft. Due to this space at least a relatively great proportion of the oil emerging from the oil delivery tube runs directly back into the oil reservoir. The portion that reaches the inner wall of the oil pumping passage cannot be repeatably adjusted. This is true especially in view of varying oil temperatures and the consequently varying viscosity of the oil. Precisely at the high oil temperatures which are reached after long operation at high rotational speeds, however, it is necessary to assure a continuous and measured oil supply.

SUMMARY OF THE INVENTION

A principal object of the present invention is to create a system of the type described above, which assures a continuous and repeatable supply of oil from the oil delivery tube to the inner wall of the oil pumping passage in the shaft.

This object, as well as other objects which will become apparent from the discussion that follows, are accomplished, in accordance with the present invention, by associating with the mouth of the oil delivery tube a means for carrying the oil onto the inner wall of the oil pumping passage. This positive transfer of the delivered oil to the inner wall of the oil pumping passage in the shaft makes possible the repeatable setting of the rheological conditions of the oil, and a continuous flow of oil is assured. The rate of flow of the oil can be adapted to the desired level.

In one embodiment of the invention a crosspiece connected to the shaft is provided directly adjacent the mouth of the oil delivery tube. The space between the end of the oil delivery tube and this crosspiece can be so small (e.g., a few tenths of a millimeter) that oil emerging from the upper opening of the oil delivery tube touches the crosspiece rotating with the shaft. Along this crosspiece the oil is transported by centrifugal force to the inner wall of the oil pumping passage of the shaft. A continuous oil feed is thus assured. A special advantage of this embodiment is that it is insensitive to temperature changes. If, for example, a temperature change occurs and thus a change in the viscosity of the oil, then the shape of the meniscus of the oil emerging from the tube changes. In the case of a temperature rise, for example, it becomes flatter. But a temperature rise also results in the elongation or expansion of the shaft, so that the flattening of the oil meniscus is compensated.

Advantageously, the oil delivery tube is axially adjustable, so that the space between crosspiece and orifice is variable. The oil throughput is thus controllable.

In another embodiment the oil delivery tube is equipped with a lip, of mushroom shape for example, reaching toward the inner wall of the oil pumping passage. Furthermore, the opening of the oil pumping passage is smaller in cross section than the margin provided on the oil delivery tube. In this embodiment the oil drips downwardly from the lip in the case of a vertically disposed shaft. Since the bottom opening of the oil pumping passage is smaller than this lip, the oil reliably passes over onto the rotating inner wall of the oil pumping passage.

For a full understanding of the present invention, reference should now be made to the following detailed description of the preferred embodiments of the invention and to the accompanying drawings.

BRIEF DESCRIPTION OF THE DRAWINGS

FIGS. 1 and 4 are diagrammatic representations of oil feeders in accordance with the principles of the present invention.

FIGS. 2 and 3 are details of the oil feeder configuration represented in FIG. 1.

FIG. 5 represents a particular embodiment of the present invention in which the principle represented in FIG. 1 is applied.

DESCRIPTION OF THE PREFERRED EMBODIMENTS

Figure 6:
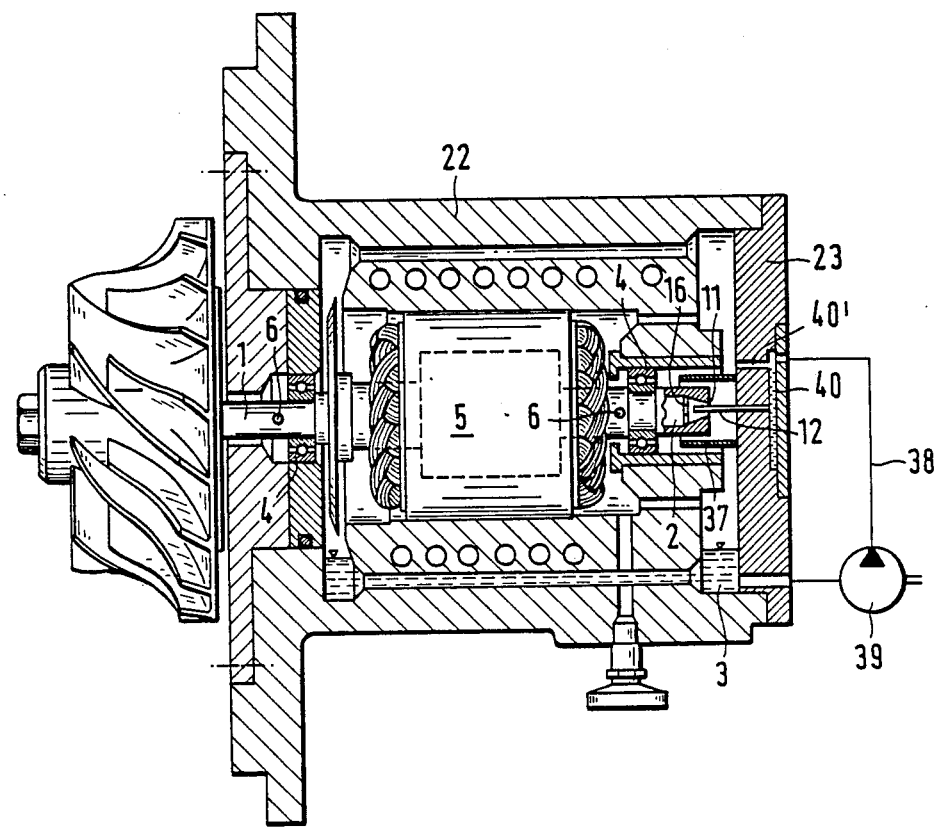
FIG. 6 is another embodiment of the present invention in which the shaft does not have to be disposed vertically.

In all figures the shaft is shown as element 1. It is hollow and has in its center the oil pumping passage 2. The oil pumping passage 2 serves to transport lubricant oil from a reservoir 3 to the shaft bearings 4. Usually, drive shafts rotating at high speed are equipped with two bearings 4 which are disposed at the top and at the bottom of a motor 5 (cf. FIG. 6). In FIG. 5 the motor is only partially visible and only one of the bearings 4 is represented. The axis of rotation is indicated by the dotted dashed lines.

The oil pumping passage 2 is either at least partially of a conically flaring configuration or it has corresponding steps in it so that the oil is pumped toward bearing 4. In the vicinity of the bearing 4, preferably above bearing 4 in the case of a vertical shaft, bores 6 are provided which connect the spaces in the area of bearings 4 to the oil pumping passage 2. Lubricating oil emerges from these bores 6 and flows back through the bearings 4 to the oil reservoir 3. The oil sprayed above the upper bearing and flows through a passage running parallel to the motor chamber and back.

In the embodiment in FIG. 1, the open end of the shaft is provided with an orifice 11 through which the oil delivery tube 12 extends into the oil pumping passage 2. The diameter of the oil pumping passage 2 is larger than the orifice 11, so that the step 13 that causes the oil to be advanced is formed.

The mouth 14 of the oil delivery tube 12 is associated with a crosspiece 15 which is fastened to the inner wall of the oil pumping passage 2, so that the crosspiece rotates with the shaft 1. The distance between the upper end of the oil delivery tube 12 and the crosspiece 15 is made so small that oil emerging from the mouth makes contact with the crosspiece 15. The oil adhering to the crosspiece 15 is transported by centrifugal force to the inner wall of the oil pumping passage 2 and driven upward as a result of the step 13. If the distance between the mouth 14 and the crosspiece 15 is made sufficiently small (e.g., a few tenths of a millimeter) a positive transfer of the oil to the crosspiece 15 is assured. Interruptions of the oil stream cannot occur.

FIGS. 2 and 3 show an embodiment in which a cross-shaped element 16 is provided instead of the crosspiece 15. In this embodiment four arms are provided, over which the oil passes to the inner wall of the oil pumping passage 2. In addition, the cross-shaped element 16 is centrally provided with an apex, of conical shape for example, which reaches into the mouth 14 of the oil delivery tube 12. Such an apex is only necessary, however, when the space between the crosspiece 15 of the cross-shaped element 16 and the upper end of the oil feed tube 12 is relatively great.

FIG. 4 shows an embodiment in which the oil delivery tube 12 is equipped with a mushroom-shaped collar or lip 21. The outside diameter of the lip is greater than the bottom opening 11 in the shaft 1. Oil thrown from the lip 21 thus is positively placed onto the inner wall of the oil pumping passage 2, which is this embodiment is configured to flare upward, conically for example, in its lower area.

In comparison to the embodiment according to FIG. 1, the embodiment of FIG. 4 has the disadvantage that the collar 21 is situated above the opening 11 and has a larger diameter than the opening 11. The solution provided in FIG. 4 therefore calls for a complex method of assembly if the collar 21 is rigid. If, however, at least the collar 21 consists of resilient material which can be pushed through the opening 11 without destruction, the method of assembly is less complicated.

To perform the function of driving oil to the inner wall of the oil pumping passage 2, the lip or collar does not have to extend over 360°. Even a star-shaped configuration of the upper lip 21 of the oil delivery tube 12 can serve this purpose.

FIG. 5 shows an embodiment for a drive with a vertically disposed shaft 1 and an oil delivery system in accordance with FIG. 1. The drive includes the substantially cylindrical housing 22 whose bottom opening is closed by the first cover 23. The oil reservoir 3 is formed by recesses 24 in the housing 22 and bores 25 in the cover 23. The cover 23 is equipped with an additional, small cover 26 whose inner side is provided with a recess 27. The recess 27 connects the bores 25.

The oil delivery tube 12 is a component of a screw 28 which is driven into the cover 23 (thread 29). The ring 31 increases the friction between screw 28 and cover 23, so as to prevent any unintentional change in the setting of screw 28. The passage formed by the oil delivery tube 12 continues downward through the screw 28 and opens inside of the recess 27 in the smaller cover 26.

The lower end of the shaft 1 consists of a cylindrical fitting 33 which is screwed coaxially onto the shaft 1 (thread 34). The fitting 33 has two internal steps 35 and 36. The cross-shaped element 16 lies on the upper step 35 and is associated with the upper opening 14 of the oil delivery tube 12. It is fixed between the upper step 35 and the upper part of shaft 1. The step 36 causes the oil reaching the inner wall of the oil pumping passage 2 to be transported upwardly, since the bottom opening 11 in fitting 33 is smaller than the diameter of the oil pumping passage 2.

During operation, oil emerges from the upper mouth 14 of the oil delivery tube 12 and passes over the four limbs of the cross-shaped element 16 onto the inner wall of the oil pumping passage 2, and is driven upward and fed through the spray openings 6 to the bearings 4. From there it returns to the oil reservoir 3.

To replace the oil in the oil reservoir, the smaller cover 26 is removed. This provides access to the head of screw 28. By turning the screw 28 the height of the upper mouth 14 of the oil delivery tube 12, and thus its distance from the crosspiece 16, can be adjusted. In this way the throughput of the oil is controllable.

The sleeve 37 is provided in order to prevent the oil in oil reservoir 3 from coming directly in contact with the bottom end of shaft 1 or with the fitting 33. As its bottom the sleeve 37 is fastened to the cover 23. Its upper end is situation above the level of the oil is reservoir 3.

FIG. 6 shows as an embodiment a portion of a radial blower which can be operated in any position of shaft 1 between the vertical and the horizontal. To make this possible the oil reservoir 3 is disposed laterally in the housing 22. The oil reservoir 3 is connected to the oil delivery tube 12 by a tube 38 in which an oil pump 39 is situated. The oil pumped by the oil pump from the reservoir 3 to the oil delivery tube first enters into a chamber 40 with an overflow 40. The chamber 40 is in communication with the oil delivery tube 12. The oil, as described above, passes through the oil delivery tube over the limb 16 to the inner wall of the oil pumping passage 2 and from there through bores 6 to bearings 4. From there it flows back into the reservoir 3. The overflow 40' makes it possible to use oil pumps 39 which pump larger volumes of oil. The oil stream control is performed as described previously by the finely controllable tube-and-crosspiece system.

Figure 7:
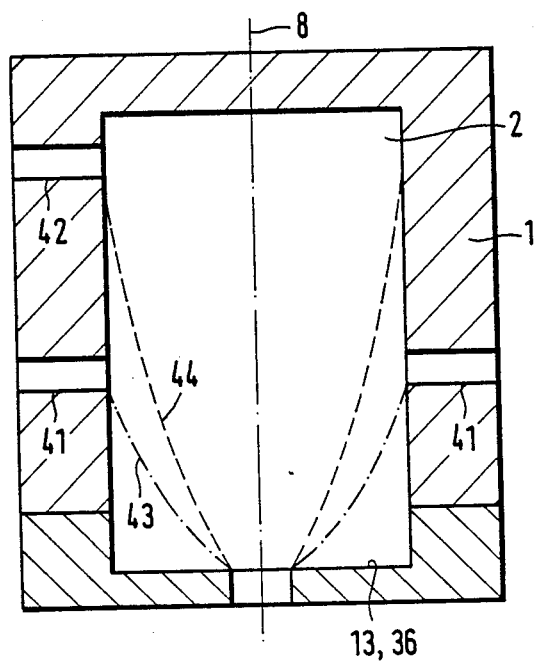
FIG. 7 and 8 are diagrammatic sketches showing two configurations of an oil pumping passage in a shaft.

FIGS. 7 and 8 again show the shaft 1 with the internal oil pumping passage 2 centered on and coaxial with the axis 8, and the step 13 or 36, which is present in order to pump the oil to the spray openings 41 and 42. From FIG. 7 it can be seen that, especially when a plurality of spray openings 41 adjacent to the oil delivery are present, there is a possibility that the oil will fail to reach the more remote spray opening 42. The oil rotating with the shaft 1 assumes the position represented by the curve 43. What is desired, however, is a position approximating that of curve 44 so that the upper bearing will be supplied with oil.

Figure 8:
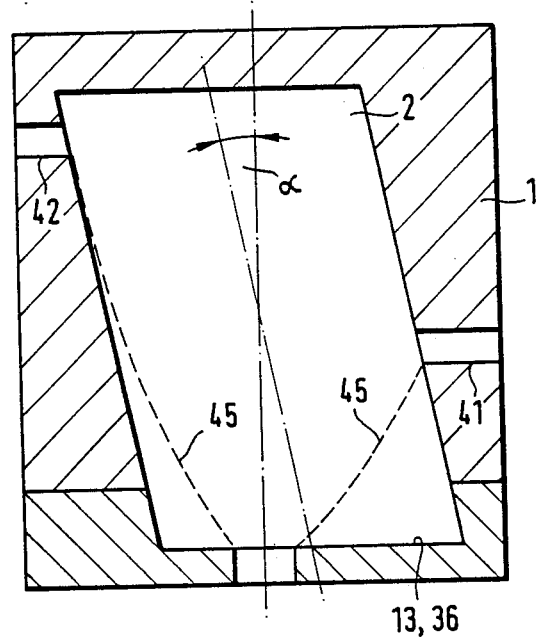

To avoid the possibility of failure to supply oil to the more remote bearing, it is proposed in accordance with the present invention to arrange the oil pumping passage 2 at an angle to the central axis 8, as shown in exaggerated form in FIG. 8. The spray openings 41 and 42 are disposed on opposite sides of the oil pumping passage 2, opening 42 for supplying the more remote bearing being on the side indicated by the direction of the tilt of the oil pumping passage. In the case of a rotating shaft 1 with a tilted oil pumping passage 2, the co-rotating oil assumes the position corresponding to the curve 45. From this curve it can be seen that the danger that all the oil might be spray through opening 41 no longer exists. In any event the oil will definitely also reach the spray opening 42. In a practical embodiment, the angle $\alpha$ between the axis of shaft 1 and the inclined oil pumping passage 2 can be approximately 0.2°, for example.

There has thus been shown and described a novel lubricating oil feed system which fulfills all the objects and advantages sought therefor. Many changes, modifications, variations and other uses and applications of the subject invention will, however, become apparent to those skilled in the art after considering this specification and the accompanying drawings which discloses and preferred embodiments thereof. All such changes, modifications, variations and other uses and applications which do not depart from the spirit and scope of the invention are deemed to be covered by the invention which is limited only by the claims will follow.

What is claimed is:

1. An oil lubricating system for supplying oil to the bearings of a shaft having a central oil pumping passage with an opening at one end, said system comprising
   an oil delivery tube extending through said opening, said tube having a mouth in said passage,
   a cross-piece adjoined to said shaft in said passage immediately adjacent the mouth of the oil delivery tube.

2. An oil lubricating system as in claim 1 wherein said shaft has oil spray openings leading from said passage to the bearings, said oil pumping passage having a central axis which is inclined with respect to the rotational axis of the shaft, said oil spray openings being located on opposite sides of said rotational axis and axially spaced, the oil spray opening farthest from the end of the shaft being located on the side which diverges from said rotational axis relative to distance from said end.

3. The lubricating system in accordance with claim 1, wherein the crosspiece is of a cruciform configuration.

4. The lubricating system in accordance with claim 1, wherein the crosspiece is equipped with a substantially conical apex that extends toward the mouth of the oil delivery tube.

5. The lubricating system in accordance with claim 1, wherein the oil delivery tube is axially adjustable.

6. The lubricating system in accordance with claim 1, further comprising a housing for said bearings and a cover on said housing adjacent the end of said shaft, wherein the oil delivery tube is a component of a screw which is inserted in the housing cover.

7. The lubricating system in accordance with claim 1, wherein the end of the shaft facing the oil delivery tube includes a substantially cylindrical fitting and wherein this fitting is provided with the opening and with at least one step for producing the oil pumping.

8. The lubricating system in accordance with claim 1, wherein the end of the shaft facing the oil delivery tube includes a substantially cylindrical fitting and wherein this fitting is provided with the opening and with a conical section producing the oil pumping.

9. The system in accordance with claim 1, wherein an oil reservoir is situated laterally beside the shaft, wherein the oil delivery tube is connected to the oil reservoir by a pipeline and wherein an oil pump is situated in the pipeline.

10. The system in accordance with claim 9, wherein the pipeline leads into a chamber with an overflow and wherein the chamber is in communication with the oil delivery tube.

11. The system in accordance with claim 1, wherein the shaft is disposed vertically, wherein the bottom end of the oil supply tube is immersed in an oil reservoir and wherein the bottom end of the shaft is surrounded by a sleeve preventing the access of the oil from the oil reservoir.

* * * * *

UNITED STATES PATENT AND TRADEMARK OFFICE
CERTIFICATE OF CORRECTION

PATENT NO.   :   4,915,194

DATED        :   April 10, 1990

INVENTOR(S)  :   Englander et al.

It is certified that error appears in the above-identified patent and that said Letters Patent is hereby corrected as shown below:

Column 2, line 64, delete "and".

Column 4, line 36, after "40" insert -- ' --.

Signed and Sealed this

Twenty-fifth Day of August, 1992

Attest:

DOUGLAS B. COMER

Attesting Officer

Acting Commissioner of Patents and Trademarks